United States Patent
Herrero et al.

(10) Patent No.: US 10,142,229 B2
(45) Date of Patent: Nov. 27, 2018

(54) CONCEALED DATAGRAM-BASED TUNNEL FOR REAL-TIME COMMUNICATIONS

(71) Applicant: Oracle International Corporation, Redwood Shores, CA (US)

(72) Inventors: Rolando Herrero, Derry, NH (US); Henry Katz, Brookline, MA (US); Michael Y. Deng, Belmont, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 124 days.

(21) Appl. No.: 14/657,227

(22) Filed: Mar. 13, 2015

(65) Prior Publication Data
US 2016/0269285 A1 Sep. 15, 2016

(51) Int. Cl.
*H04L 12/741* (2013.01)
*H04L 12/46* (2006.01)
*H04L 29/06* (2006.01)

(52) U.S. Cl.
CPC .......... *H04L 45/74* (2013.01); *H04L 12/4633* (2013.01); *H04L 65/1003* (2013.01); *H04L 65/1069* (2013.01)

(58) Field of Classification Search
CPC . H04L 12/56; H04L 2012/56; H04L 29/0653; H04L 29/06095; H04L 49/3009; H04L 49/309; H04L 45/74; H04L 47/10; H04L 12/5602; H04Q 11/06; H04J 2203/0005; H04J 3/08
USPC ............ 370/389, 372, 392, 231, 393, 395.2, 370/395.3, 395.52
See application file for complete search history.

(56) References Cited

U.S. PATENT DOCUMENTS

| | | | | | |
|---|---|---|---|---|---|
| 6,976,205 | B1* | 12/2005 | Ziai | .......................... | H04L 69/16 714/807 |
| 6,977,896 | B1* | 12/2005 | Kobayashi | .......... | H04L 12/5695 370/235 |
| 8,880,728 | B2* | 11/2014 | Winchester | ......... | H04L 12/4633 709/238 |
| 2006/0235939 | A1* | 10/2006 | Yim | ...................... | H04L 63/029 709/217 |
| 2006/0256815 | A1* | 11/2006 | Kivinen | .............. | H04L 12/4633 370/466 |
| 2013/0283037 | A1* | 10/2013 | Katz | ....................... | H04L 63/04 713/151 |

(Continued)

OTHER PUBLICATIONS

Oracle Communications; Oracle Data Sheet; "ACME Packet 4500"; http://www.oracle.com/us/industries/communications/acme-packet-4500-ds-1990148.pdf; last downloaded Oct. 20, 2014.

(Continued)

*Primary Examiner* — Brenda H Pham
(74) *Attorney, Agent, or Firm* — Potomac Law Group, PLLC (57) ABSTRACT

A system performs tunneling of real-time communications ("RTC"). The system establishes a tunnel between a tunneling client and a tunneling server. The system then receives a packet over the tunnel. The packet is configured according to an outer transport protocol of the tunnel and includes a datagram-based payload and a stream-based header. The system processes the packet according to a datagram-based outer transport protocol based on information in the stream-based header.

20 Claims, 4 Drawing Sheets

(56) References Cited

U.S. PATENT DOCUMENTS

2015/0188943 A1* 7/2015 Williams ............ H04L 63/0272
713/151

OTHER PUBLICATIONS

3rd Generation Partnership Project; Technical Specification Group Services and System Aspects; Study on firewall traversal (Stage 2) (Release 12); 3GPP TR 33.830 V0. 5.0 (Nov. 2013).

* cited by examiner

| Source Port (16) | Destination Port (16) | | |
|---|---|---|---|
| Sequence Number (32) | | | |
| Acknowledgment Number (32) | | | |
| Header Length (4) | Reserved (6) | Code Bits (6) | Window Size (16) |
| Checksum (16) | | | Urgent (16) |
| Datagram Payload | | | |

CONCEALED DATAGRAM-BASED TUNNEL FOR REAL-TIME COMMUNICATIONS

FIELD

One embodiment is directed generally to a communications network, and in particular, to delivering real-time traffic over a communications network.

BACKGROUND INFORMATION

Many enterprises have moved from telephony services using the Public Switched Telephone Network ("PSTN") (provided by a traditional telephone company) to telephony services using the Internet Protocol ("IP") (provided by an IP Telephony service provider). Such services are commonly known as Voice over IP ("VoIP") or IP Telephony. IP Telephony uses an IP network (e.g., the Internet) as a backbone and can thus provide advanced features such as video conferencing, call recording, and call forwarding.

Recently, driven by the growing base of mobile data subscribers, ubiquitous Internet access, and high bandwidth that is now available in both fixed and mobile networks, advanced services accessed via the Internet (known as Over-the-Top ("OTT") services) have become popular. However, while OTT services threaten traditional telephony offerings, innovative service providers are introducing their own OTT services, and must therefore overcome a number of unique challenges as they deploy and market these new services.

SUMMARY

One embodiment is a system for tunneling of real-time communications ("RTC"). The system establishes a tunnel between a tunneling client and a tunneling server. The system then receives a packet over the tunnel. The packet is configured according to an outer transport protocol of the tunnel and includes a datagram-based payload and a stream-based header. The system processes the packet according to a datagram-based outer transport protocol based on information in the stream-based header.

DETAILED DESCRIPTION

One embodiment provides real-time communications ("RTC") services in a network environment by tunneling datagram traffic with a stream-based header. In one embodiment, a server implements a tunnel according to a protocol, hereinafter referred to as a concealed datagram protocol ("CDP"), which provides the same header as a stream-based protocol, but carries a datagram payload. Although CDP has a stream-based header, it is configured for low-overhead operation and reduced latency as in datagram-based protocols, rather than error checking and delivery validation as in stream-based protocols. However, since CDP has the same header as a stream-based protocol, it can traverse firewalls that check packet headers and allow only stream-based protocols. Accordingly, embodiments result in efficient tunneling of datagram-based traffic while also traversing firewalls that allow only stream-based protocols.

Figure 1:
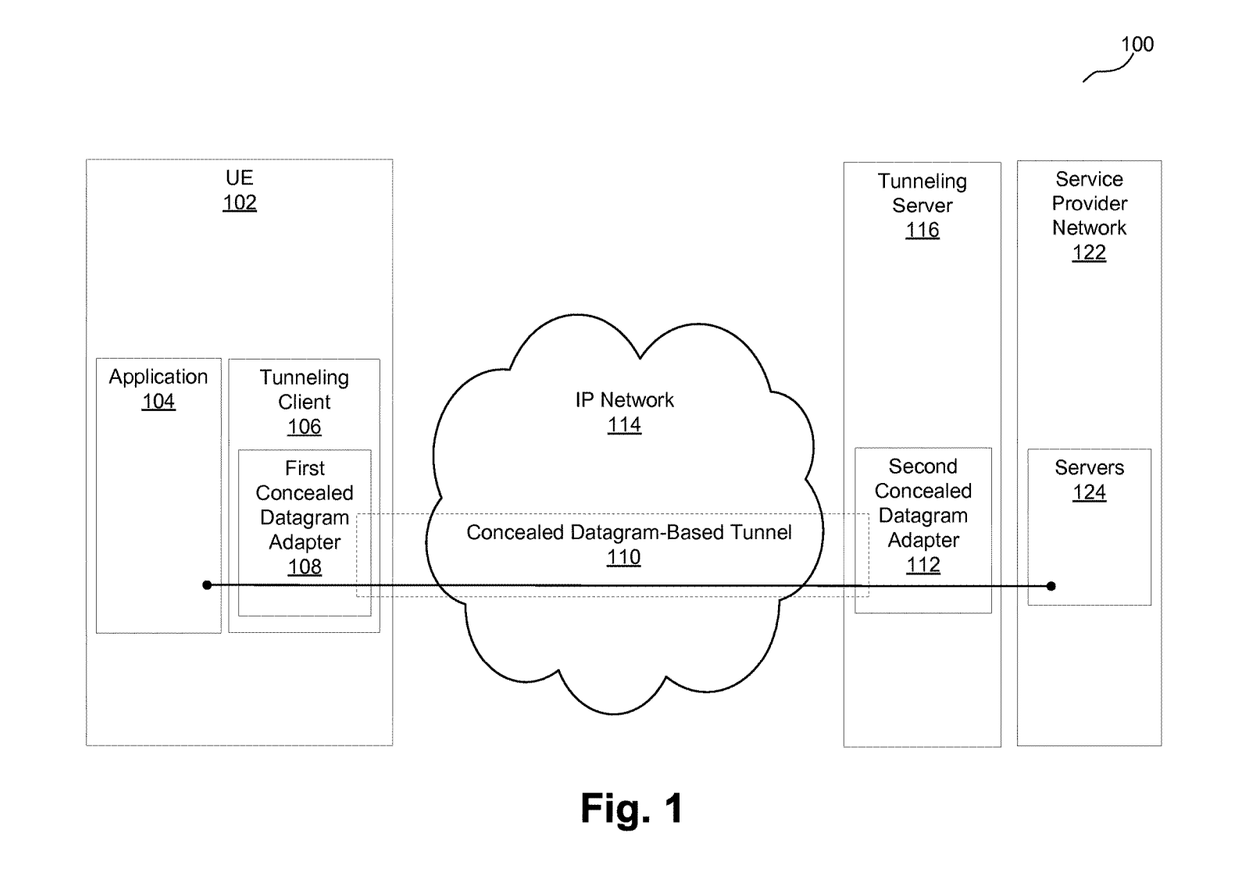
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs RTC over an Internet Protocol ("IP") network 114 with a service provider network 122. RTC refers to a mode of communication in which users exchange information instantly or with negligible latency. Example applications for RTC include voice and/or video calls, application streaming, softphones, and remote desktop applications. UE 102 may be any device used by an end-user for communication, such as a smartphone, a laptop computer, a tablet, a television, etc.

In performing RTC, UE 102 communicates signaling and media traffic with respective servers 124 in service provider network 122. Signaling traffic may be communicated according to an application layer protocol such as the Session Initiation Protocol ("SIP"). SIP is a signaling communications protocol, conventionally used for controlling multimedia communication sessions such as voice and video calls over IP networks. SIP is configured to be independent of the underlying transport layer. Accordingly, SIP can run on different transport protocols, such as the Transmission Control Protocol ("TCP"), the User Datagram Protocol ("UDP"), etc.

TCP is one of the core protocols of the IP suite and provides reliable, ordered, and error-checked delivery of a stream of octets between programs running on computers connected to an IP network such as a local area network, an intranet, or the public Internet, as described in, for example, Internet Engineering Task Force ("IETF") request for comments ("RFC") 793 and RFC 675. A datagram is a basic transfer unit associated with a packet-switched network for which the delivery, arrival time, and order of arrival need not be guaranteed by the network. UDP is a protocol that uses a simple connectionless transmission model with a minimum of protocol mechanisms, as described in, for example, IETF RFC 768. Applications that do not require the reliability of a TCP connection may instead use UDP which emphasizes low-overhead operation and reduced latency rather than error checking and delivery validation.

Network 100 further includes a tunneling server 116 that, together with a tunneling client 106 within UE 102, provides functionality for establishing and managing tunnels for performing RTC according to the Tunneled Services Control Function ("TSCF") standard as described in, for example, 3rd generation partnership program ("3GPP") technical report ("TR") 33.830 V0.5.0, the disclosure of which being incorporated herein by reference. In general, using a tunnel for communication refers to using a delivery protocol to encapsulate a different payload protocol. The TSCF standard provides client side and server side network elements for establishing managed Transport Layer Security ("TLS") tunnels for performing RTC. TLS is a cryptographic protocol configured to provide communication security over the Internet. TLS is an IETF standards track protocol as provided in, for example, IETF RFC 2246, RFC 4346, RFC 5246, and/or RFC 6176.

The TSCF standard provides control messages for exchanging configuration information between client side and server side network elements that establish and manage TLS tunnels for performing RTC. According to the TSCF standard, control messages between tunneling client 106 and tunneling server 116 are of a "request/response" type, and a control message response for a request includes either a corresponding reply or an error code indicating why the request could not be honored. TSCF control messages utilize a Type Length Value ("TLV") encoding. TLV is defined as the variable length concatenation of a unique Type (represented by an integer) and a Value containing the actual value identified by the Type.

Each TSCF control message includes a control message header at the beginning. Table 1 below provides an example TSCF control message header configuration.

TABLE 1

An example TSCF control message header configuration

| Field Name | Value Type | Length |
|---|---|---|
| CM_Version | Unsigned integer | 4 bits |
| CM_Indication | bits | 2 bits |
| Reserved | bits | 2 bits |
| CM_Type | Unsigned integer | 1 byte |
| TLV_Count | Unsigned integer | 2 bytes |
| Tunnel Session ID | Unsigned integer | 8 bytes |
| Sequence | Unsigned integer | 4 bytes |

In the header configuration of Table 1, the "CM_Version" field is the first nibble (i.e., 4 bits) of the first byte and identifies the version of the header. Currently version 1 is supported, and versions 4 and 6 are reserved for IP payload differentiation (the first nibble of the first byte of IP header is the IP header version which is 4 for IPv4 and 6 for IPv6). The "CM_Version" field is required to indicate the outer transport protocol of a TSCF tunnel. The "CM_Indication" field identifies whether the message is a control message or not. This field must be set to 0 to indicate that a message is a control message. The "Reserved" field is reserved for future use and its bits are set to zero. The "CM_Type" field identifies the type of the control message, e.g., whether it is a request or a response, and the functionality it is used for. The "TLV_Count" field indicates the number of TLVs that follow (or are appended to) the header in the current control message. The control message header itself is not a TLV and is not counted as one. The "Tunnel Session ID" ("TSID") field includes a TSID that is assigned by tunneling server 116 to uniquely identify a TSCF tunnel. The "Sequence" field is an ever incrementing transaction counter so that each outstanding "request" message includes a unique value in this field.

In one embodiment, in order to establish a TSCF tunnel, tunnelling client 106 sends a "configuration request" message to tunnelling server 116 to obtain configuration information for a TSCF tunnel. Table 2 below provides an example "configuration request" message header.

TABLE 2

An example "configuration request" message header

| Field Name | Value | Notes |
|---|---|---|
| CM_Version | 1 | Current = 1 |
| CM_Indication | 0 | Must be set as 0 to indicate this is a control message |

TABLE 2-continued

An example "configuration request" message header

| Field Name | Value | Notes |
|---|---|---|
| Reserved | 0 | Must be set as 0 |
| CM_Type | 1 | Indicates a "Configuration_Request" |
| TLV_Count | Variable | |
| Tunnel Session ID | FFF . . . | |

As provided in Table 2, in the "configuration request" message, all TSID header field bits are set to 1 (i.e., FFFF . . . ). In response, tunnelling server 116 assigns a TSID to a TSCF tunnel and sends a "configuration response" message back to tunnelling client 106. Table 3 below provides an example "configuration response" message header.

TABLE 3

An example "configuration response" message header

| Field Name | Value | Notes |
|---|---|---|
| CM_Version | 1 | Current = 1 |
| CM_Indication | 0 | Must be set as 0 to indicate this is a control message |
| Reserved | 0 | Must be set as 0 |
| CM_Type | 2 | Indicates a "Configuration_Response" |
| TLV_Count | Variable | |
| Tunnel Session ID | The TSID assigned by the tunnelling server | |

As provided in Table 3, the "configuration response" message includes the assigned TSID. All following messages between tunnelling client 106 and tunnelling server 116 include this assigned TSID in their headers. In one embodiment, if a control message is communicated between tunnelling client 106 and tunnelling server 116 and does not have the expected TSID, the control message is dropped and the corresponding TSCF tunnel is terminated. Alternatively, in one embodiment, tunnelling client 106 may send a "configuration release request" message to tunnelling server 116 to terminate a TSCF tunnel. In response to such a "configuration release request" message, tunnelling server 116 sends a "configuration release response" message to tunnelling client 106. At this time, the TSCF tunnel is terminated.

The TSCF standard provides two types of outer layer tunneling transports: a stream-based outer layer tunneling transport via TCP or TLS, and a datagram-based outer layer tunneling transport via UDP or Datagram Transport Layer Security ("DTLS"). DTLS is a protocol that provides communications privacy for datagram protocols. DTLS allows datagram-based applications to communicate in a way that prevents eavesdropping, tampering, or message forgery. DTLS is based on the stream-oriented TLS protocol and provides similar security guarantees. TCP and TLS provide reliable, ordered and error-checked delivery of the inner layer traffic, but introduce undesirable latency that is detrimental to RTC applications over a communications network that experiences impairments. On the other hand, UDP and DTLS do not guarantee reliable delivery, thus minimizing latency and being desirable for RTC.

In some embodiments, IP network 114 may include security devices (e.g., firewalls, proxies, etc.) that allow traffic of only a certain transport protocol (e.g., only TCP, only UDP, etc.). Accordingly, tunneling client 106 and tunneling server 116 may establish and manage a corresponding TSCF tunnel so that UE 102 may use the TSCF tunnel to traverse such security devices and connect to tunneling server 116 to reach service provider network 122.

In one embodiment, UE 102 may execute a SIP based RTC application (e.g., application 104) that relies on a library such as the software development kit ("SDK") provided by the tunneled session management solution from Oracle Corp.

Figure 2:
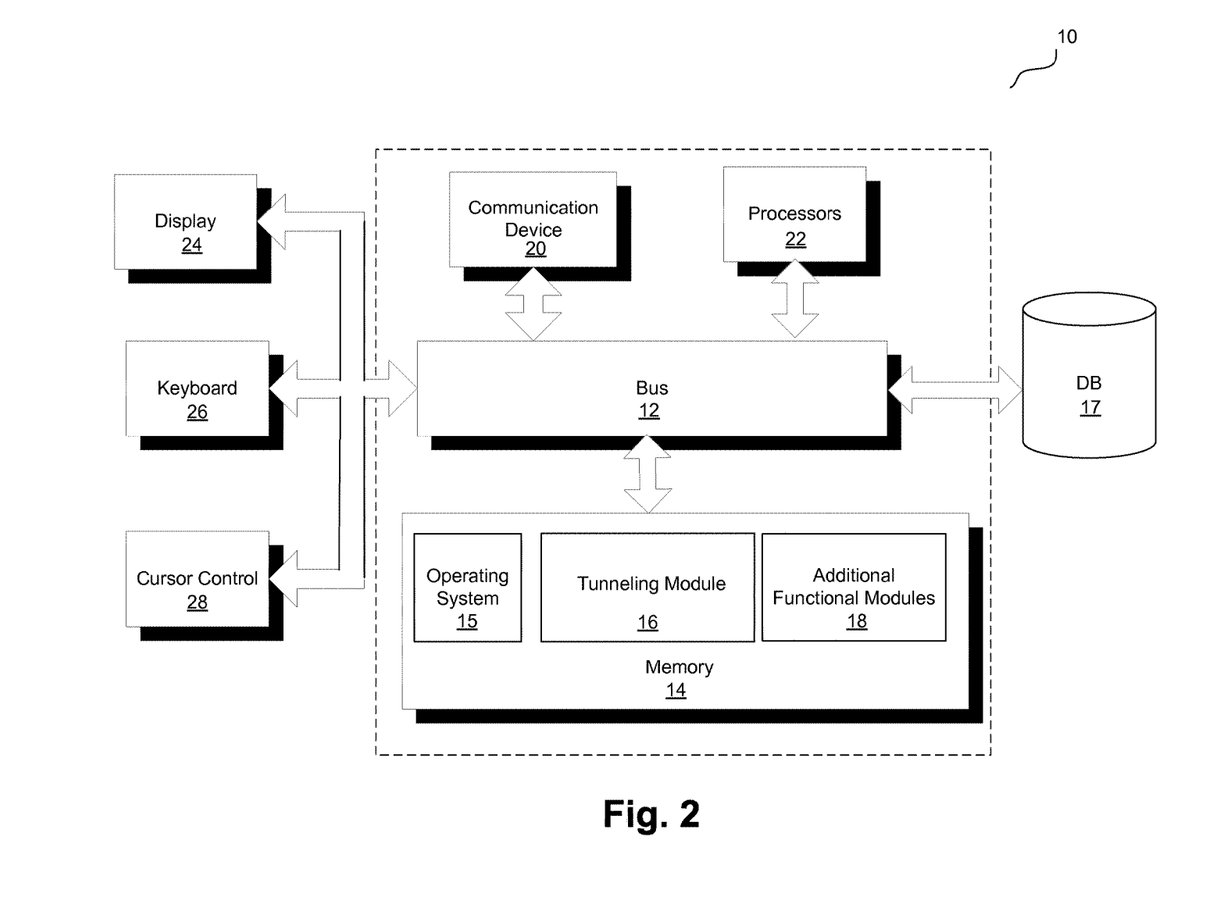
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of a tunneling server, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a tunneling module 16 for providing tunneling, and all other functionality disclosed herein. In one example embodiment, tunneling module 16 may implement tunneling server 116 of FIG. 1 in conjunction with one or more remaining elements of FIG. 2. System 10 can be part of a larger system, such as added functionality to the "Acme Packet 4500" session border controller from Oracle Corp. Therefore, system 10 can include one or more additional functional modules 18 to include the additional functionality. A database 17 is coupled to bus 12 to provide centralized storage for tunneling module 16 and additional functional modules 18.

Figure 4:
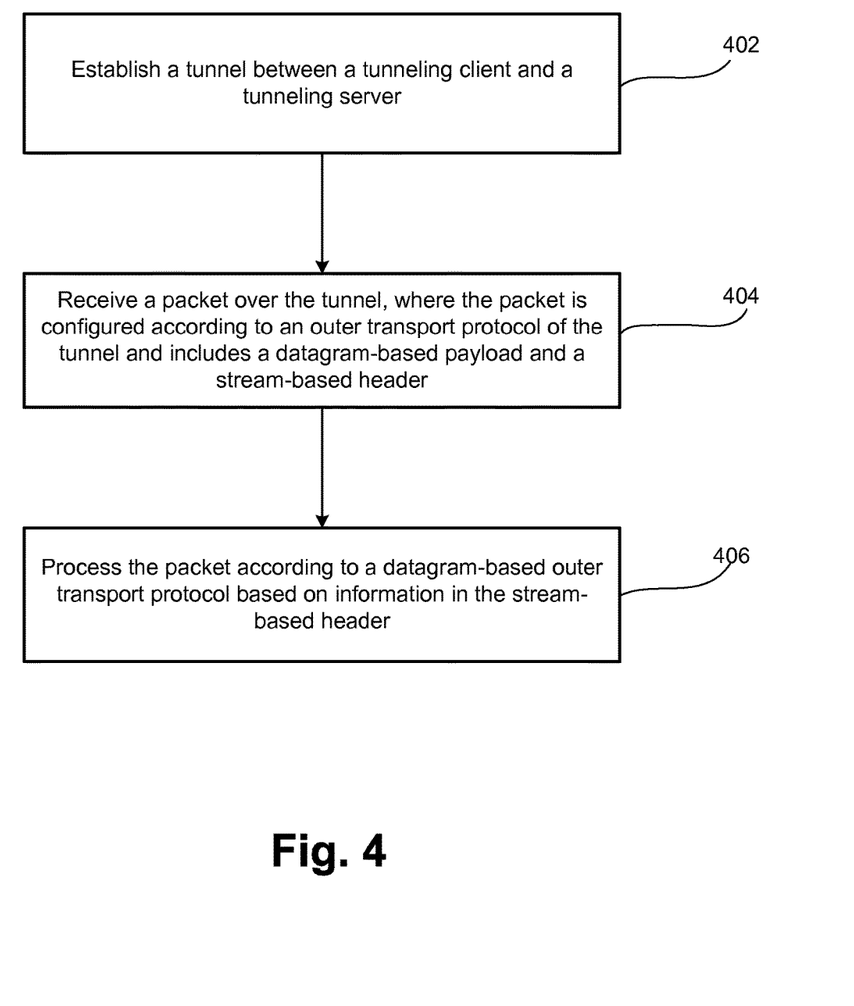
FIG. 4 is a flow diagram of the operation of the tunneling module of FIG. 2 when performing tunneling in accordance with embodiments of the present invention.

In one embodiment, tunneling module 16 and/or additional functional modules 18 may include an establishing module that establishes a tunnel between a tunneling client and a tunneling server; a receiving module that receives a packet over the tunnel, where the packet is configured according to an outer transport protocol of the tunnel and includes a datagram-based payload and a stream-based header; and a processing module that processes the packet according to a datagram-based outer transport protocol based on information in the stream-based header, as will be described herein with reference to FIG. 4.

Referring again to FIG. 1, with known systems, RTC applications (e.g., speech, video, etc.) are highly affected by network latency, and therefore require an outer datagram tunneling transport (e.g., UDP or DTLS) that minimizes latency in order to guarantee acceptable call quality. Accordingly, to address RTC quality requirements, tunneling client 106 and tunneling server 116 may have to establish a TSCF tunnel with an outer datagram-based tunneling transport.

One disadvantage with these known systems is that, when providing access to web traffic, most public IP networks implement firewalls that are configured to filter datagram-based traffic (e.g., UDP and DTLS) and allow only stream-based traffic to go through, thus introducing restrictions on media and resulting in severe degradation of RTC quality.

One known solution to allow tunneled traffic to traverse firewalls is to modify the transport network by reconfiguring routers and firewalls and changing the corresponding hardware to allow datagram-based protocols to traverse. One disadvantage with this known solution is that it involves significant network changes and may be expensive and time consuming. Another known solution to allow tunneled traffic to traverse firewalls is to encapsulate real-time media (e.g., speech, video, etc.) within a stream-based tunnel (e.g., a TCP tunnel) rather than a datagram-based tunnel (e.g., a UDP tunnel). One disadvantage with this latter known solution is that using a stream-based transport such as TCP introduces impairments (e.g., latency) and therefore degrades the overall end user experience.

In contrast to the known solutions, embodiments of the present invention provide a new outer transport protocol, herein referred to as CDP, that behaves as a datagram-based transport (e.g., a UDP transport) but uses the same header configuration as a stream-based protocol (i.e., uses a stream-based header) to present itself to the IP network as stream-based traffic (e.g., TCP traffic). In some embodiments, tunneling client 106 and tunneling server 116 understand CDP, but to the intermediate devices that only inspect specific fields of transport headers, CDP traffic appears as stream-based traffic and therefore is not affected by filtering rules that allow stream-based traffic. Accordingly, CDP tunneled traffic may transit through a public IP network and traverse firewalls as stream-based traffic.

In one embodiment, a first concealed datagram adapter 108 at tunneling client 106 and a second concealed datagram adapter 112 at tunneling server 116 provide outer transport CDP functionality such that their respective underlying TCP stacks behave as UDP but with the UDP header replaced by a "fake" TCP header that conceals the real datagram identity of the traffic. In one embodiment, first concealed datagram adapter 108 supports outgoing CDP-based tunnels while second concealed datagram adapter 112 supports incoming CDP-based tunnels. That is, first concealed datagram adapter 108 is a tunnel client and therefore generates outgoing tunnel requests, while second concealed datagram adapter 112 is a tunnel server and therefore receives such requests. Accordingly, by implementing first concealed datagram adapter 108 and second concealed datagram adapter 112, tunneling client 106 and tunneling server 116 may establish and manage a concealed datagram-based tunnel 110 with CDP as its outer transport protocol.

In one embodiment, tunneling client 106 uses the same inner socket application programming interfaces ("APIs") for CDP transport and stream-based transport, but uses different outer tunnel creation APIs for CDP transport and stream-based transport. Accordingly, the usage of CDP for transport is transparent to application 104.

Figure 3:
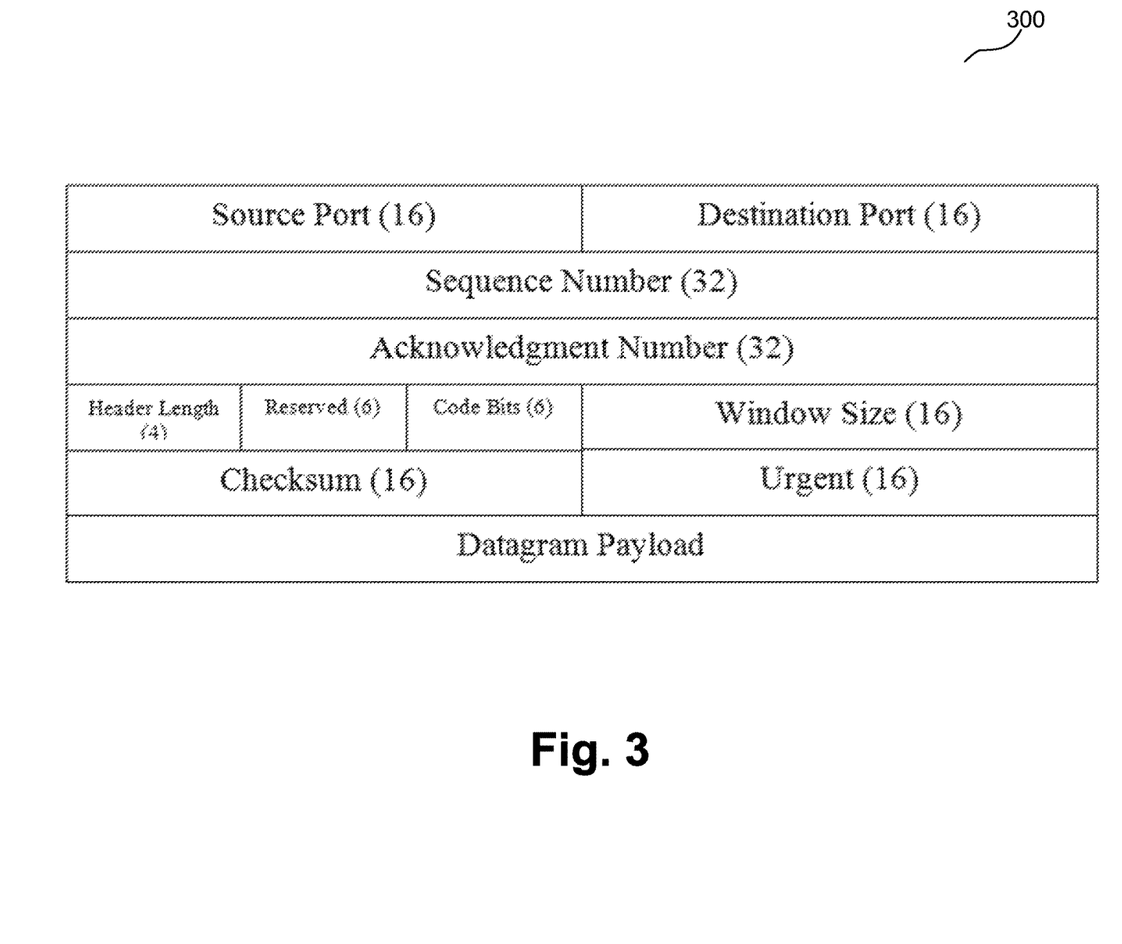
FIG. 3 illustrates an example packet configuration in accordance with embodiments of the present invention.

FIG. 3 shows an example CDP packet configuration 300 according to one embodiment. In this embodiment, CDP traffic is signaled as TCP traffic over IP by using a corresponding IP header protocol identifier. The IP header protocol identifier is an 8-bit field in the IP layer which identifies the protocol over IP. As provided in IETF, RFC 790, the protocol identifier for TCP is 6. Accordingly, in order to signal CDP traffic as TCP traffic over IP, the IP header protocol identifier uses protocol number 6.

CDP packet configuration 300 includes datagram payload and a CDP header that has the same structure as a TCP header. A TCP header has a different structure than a datagram header (e.g., a UDP header). A UDP header is 64 bits long and as provided in IETF, RFC 768. However, in one embodiment, the CDP header is a stream-based header based on TCP and therefore includes the following fields which have the same meaning/usage as in a TCP header:

Source Port (16 bits): CDP source port;
Destination Port (16 bits): CDP destination port;
Sequence Number (32 bits): Always set to 0 in CDP;
Acknowledgment Number (32 bits): Always set to 0 in CDP;
Header length (4 bits): Always set to 5 in CDP (i.e., fixed, no options);
Reserved (6 bits);
Code Bits (6 bits): Always set to 0 in CDP;
Window Size (16 bits): Always set to 0 in CDP;
Checksum (16 bits): Calculated based on TCP rules to go through firewalls;
Urgent (16 bits): Always set to 0 in CDP.

In CDP packet configuration 300, the "Source Port" and the "Destination Port" fields identify the end points of the connection. The "Sequence Number" field specifies the number assigned to the first byte of data in the current message, and is always set to 0 in CDP. The "Acknowledgement Number" field includes the value of the next sequence number that the sender of the segment is expecting to receive if an ACK control bit is set, and is always set to 0 in CDP.

The "Header Length" field indicates how many 32-bit words are included in the header, and is always set to 5 in CDP to indicate fixed length and no options. In one embodiment, routers in IP network 114 examine this field and identify the subject frame as a TCP frame with no extra options.

The "Reserved" field must be zero and is meant for future use. The "Code Bits" field may include one of the following flags, but is always set to 0 in CDP:

"URG" indicates that some urgent data has been placed;
"ACK" indicates that acknowledgement number is valid;
"PSH" indicates that data should be passed to the application as soon as possible;
"RST" resets the connection;
"SYN" synchronizes sequence numbers to initiate a connection;
"FIN" indicates that the sender of the flag has finished sending data.

The "Window Size" field specifies the size of the receive window of the sender (i.e., the buffer space available for incoming data), and is always set to 0 in CDP.

The "Checksum" field indicates whether the header was damaged in transit. In one embodiment, since CDP is implemented for firewall traversal, this field is calculated based on TCP rules to admit CDP through firewalls, as provided in IETF, RFC 793. In one embodiment, routers in IP network 114 ignore this field since it corresponds to the transport layer and not to the network layer.

The "Urgent" field points to the first urgent data byte in the packet, and is always set to 0 in CDP.

In one embodiment, first concealed datagram adapter 108 and second concealed datagram adapter 112 are configured to ignore the "Sequence Number" field, the "Acknowledgement Number" field, "Header Length" field, the "Code Bits" field, the "Window Size" field, and the "Urgent" field in CDP packet configuration 300, since the header corresponds to CDP traffic.

In one embodiment, routers in IP network 114 only require information on the source and destination ports and the header length, and therefore ignore the "Sequence Number" field, the "Acknowledgement Number" field, the "Code Bits" field, the "Window Size" field, and the "Urgent" field in CDP packet configuration 300.

In one embodiment, tunneling server 116 provides CDP as a protocol option for the outer transport protocol when establishing a TSCF tunnel with tunneling client 106. Table 4 below provides an example TSCF parameter configuration for selecting a tunnel transport protocol, according to some present embodiments.

TABLE 4

An example TSCF parameter configuration for selecting a transport protocol

| Parameter Name | XML tag | Data Type and Default | Value Ranges/ Possible Values | Required or Options (for feature to work)? |
|---|---|---|---|---|
| transport-protocol | transportProtocol | String | UDP TCP DTLS TLS CDP | Required to indicate outer transport protocol |

In one embodiment, second concealed datagram adapter 112 at tunneling server 116 is configured as a CDP tunnel terminator for concealed datagram-based tunnel 110 and "listens" for an incoming connection on a specific preconfigured TSCF interface.

In one embodiment, second concealed datagram adapter 112 encapsulate any IP traffic received from the clear side (i.e., the un-tunneled side of RTC, e.g., servers 124 within service provider network 122) into concealed datagram-based tunnel 110, and de-encapsulates any inner IP traffic received from concealed datagram-based tunnel 110 into the clear side.

One embodiment implements a TSCF SDK that includes a CDP transport type in a "tsc_transport" enumeration, as provided in the following functionality:

```
typedef enum
{
   tsc_transport_udp = 1,
   tsc_transport_tcp = 2,
   tsc_transport_tls = 3,
   tsc_transport_dtls = 4,
   tsc_transport_cdp = 5
} tsc_transport;
```

This functionality affects the "tsc_tunnel_params" structure used by the following function "tsc_new_tunnel" to establish new tunnels:

```
tsc_handle tsc_new_tunnel (tsc_tunnel_params * tunnel_params,
tsc_requested_config * requested_config )
```

FIG. 4 is a flow diagram of tunneling module 16 of FIG. 2 and/or tunneling server 116 of FIG. 1 when performing tunneling in accordance with embodiments of the present invention. In one embodiment, the functionality of the flow diagram of FIG. 4 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 402, tunneling client 106 and tunneling server 116 establish concealed datagram-based tunnel 110 according to CDP.

At 404, tunneling server 116 receives a packet over concealed datagram-based tunnel 110. The packet is configured according to CDP and includes a datagram-based payload and a stream-based header such as a TCP header. The stream-based header is configured such that the packet traverses a security device that allows only stream-based packets. When the stream-based header has a configuration similar to that of a TCP header, the packet is signaled as TCP traffic over a network layer. In one embodiment, within the stream-based header, a sequence number field, an acknowledgement number field, a code bits field, a window size field, and an urgent field are set to zero, a header length field is set to 5, and a checksum field is calculated based on TCP rules such that the packet traverses security devices.

At 406, tunneling server 116 processes the packet according to a datagram-based outer transport protocol based on information in the stream-based header. For example, when the stream-based header has a configuration similar to that of a TCP header, tunneling server 116 processes the packet as a UDP packet.

As disclosed, embodiments allow for a TSCF tunneling configuration that provides concealed datagram transport of real-time traffic. One embodiment provides an outer transport protocol in which each packet carries datagram-based payload but includes a stream-based header. The packets are processed as datagram-based traffic but can also traverse filtering firewalls that only allow stream-based traffic. Accordingly, embodiments give the end user the possibility of communicating low overhead datagram-based traffic through network security devices without requiring costly and time-consuming network modifications such as reconfiguration of firewalls/routers and change of hardware.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to perform tunneling for real-time communications (RTC), the performing comprising:
   establishing a datagram-based tunnel, over an Internet Protocol (IP) network that comprises security devices, between a tunneling client and a tunneling server, wherein the tunnel is configured to transport datagram based traffic and comprises a datagram-based outer transport protocol;
   receiving a packet over the datagram-based tunnel at the tunneling server from the tunneling client, wherein the packet is configured according to the datagram-based outer transport protocol of the tunnel and includes a datagram-based payload and a stream-based header, wherein the packet has traversed the datagram-based tunnel; and
   processing the packet according to the datagram-based outer transport protocol based on information in the stream-based header wherein the packet traverses the security devices;
   wherein the datagram-based payload and the datagram-based outer transport protocol is in accordance with a User Datagram Protocol (UDP) or a Datagram Transport Layer Security (DTLS) protocol, and the stream-based header is in accordance with a transmission control protocol (TCP) header and the stream-based header comprises TCP fields that comprise a sequence number field, an acknowledgement number field, a code bits field, a window size field, a checksum field, an urgent field and a header length field, and the sequence number field, the acknowledgement number field, the code bits field, the window size field, and the urgent field are set to zero, and the header length field is set to 5.

2. The computer readable medium of claim 1, wherein the security devices comprise a firewall.

3. The computer readable medium of claim 1, wherein the tunnel is established according to a tunneled services control function (TSCF) protocol.

4. The computer readable medium of claim 1, wherein the datagram-based outer transport protocol is UDP.

5. The computer readable medium of claim 4, wherein the packet is signaled as TCP traffic over a network layer in the IP network.

6. The computer readable medium of claim 1, wherein setting the header length field to 5 indicates fixed length and no options.

7. The computer readable medium of claim 4, wherein the checksum field is calculated based on TCP rules and the sequence number field and the acknowledgement number field are ignored.

8. A method of tunneling for real-time communications (RTC), comprising:
   establishing a datagram-based tunnel, over an Internet Protocol (IP) network that comprises security devices, between a tunneling client and a tunneling server, wherein the tunnel is configured to transport datagram-based traffic and comprises a datagram-based outer transport protocol;
   receiving a packet over the datagram-based tunnel at the tunneling server from the tunneling client, wherein the packet is configured according to the datagram-based outer transport protocol of the tunnel and includes a datagram-based payload and a stream-based header, wherein the packet has traversed the datagram-based tunnel; and processing the packet according to the datagram-based outer transport protocol based on information in the stream-based header wherein the packet traverses the security devices;

wherein the datagram-based payload and the datagram-based outer transport protocol is in accordance with a User Datagram Protocol (UDP) or a Datagram Transport Layer Security (DTLS) protocol, and the stream-based header is in accordance with a transmission control protocol (TCP) header and the stream-based header comprises TCP fields that comprise a sequence number field, an acknowledgement number field, a code bits field, a window size field, a checksum field, an urgent field and a header length field, and the sequence number field, the acknowledgement number field, the code bits field, the window size field, and the urgent field are set to zero, and the header length field is set to 5.

9. The method of claim 8,
wherein the security devices comprise a firewall.

10. The method of claim 8,
wherein the tunnel is established according to a tunneled services control function (TSCF) protocol.

11. The method of claim 8,
wherein the datagram-based outer transport protocol is UDP.

12. The method of claim 11,
wherein the packet is signaled as TCP traffic over a network layer in the IP network.

13. The method of claim 8,
wherein setting the header length field to 5 indicates fixed length and no options.

14. The method of claim 11,
wherein the checksum field is calculated based on TCP rules and the sequence number field and the acknowledgement number field are ignored.

15. A system for tunneling of real-time communications (RTC), comprising a processor that executes instructions to implement a plurality of modules, the modules comprising:
an establishing module that establishes datagram-based a tunnel, over an Internet Protocol (IP) network that comprises security devices, between a tunneling client and a tunneling server, wherein the tunnel is configured to transport datagram based traffic and comprises a datagram-based outer transport protocol;

a receiving module that receives a packet over the datagram-based tunnel at the tunneling server from the tunneling client, wherein the packet is configured according to the datagram-based outer transport protocol of the tunnel and includes a datagram-based payload and a stream-based header, wherein the packet has traversed the datagram-based tunnel; and a processing module that processes the packet according to the datagram-based outer transport protocol based on information in the stream-based header wherein the packet traverses the security devices;

wherein the datagram-based payload and the datagram-based outer transport protocol is in accordance with a User Datagram Protocol (UDP) or a Datagram Transport Layer Security (DTLS) protocol, and the stream-based header is in accordance with a transmission control protocol (TCP) header and the stream-based header comprises TCP fields that comprise a sequence number field, an acknowledgement number field, a code bits field, a window size field, a checksum field, an urgent field and a header length field, and the sequence number field, the acknowledgement number field, the code bits field, the window size field, and the urgent field are set to zero, and the header length field is set to 5.

16. The system of claim 15,
wherein the security devices comprise a firewall.

17. The system of claim 15,
wherein the tunnel is established according to a tunneled services control function (TSCF) protocol.

18. The system of claim 15,
wherein the datagram-based outer transport protocol is UDP.

19. The system of claim 18,
wherein the packet is signaled as TCP traffic over a network layer in the IP network.

20. The system of claim 15,
wherein setting the header length field to 5 indicates fixed length and no options.

* * * * *